United States Patent [19]

Gazzi et al.

[11] Patent Number: 4,710,211

[45] Date of Patent: Dec. 1, 1987

[54] CRYOGENIC PROCESS FOR THE SELECTIVE REMOVAL OF ACIDIC GASES FROM MIXTURES OF GASES BY SOLVENTS

[75] Inventors: Luigi Gazzi; Carlo Rescalli, both of Milan, Italy

[73] Assignee: Snamprogetti S.p.A., Milan, Italy

[21] Appl. No.: 864,133

[22] Filed: May 16, 1986

[30] Foreign Application Priority Data

May 24, 1985 [IT] Italy .................................. 20887 A/85

[51] Int. Cl.[4] ................................................. F25J 3/02
[52] U.S. Cl. ......................................... 62/17; 55/68; 55/73; 62/20
[58] Field of Search .................... 62/17, 20; 55/68, 73

[56] References Cited

U.S. PATENT DOCUMENTS 4,097,250 6/1978 Pagani et al. ............................ 62/31
4,305,733 12/1981 Scholz et al. ............................ 62/17

Primary Examiner—Ronald C. Capossela
Attorney, Agent, or Firm—Morgan & Finnegan

[57] ABSTRACT

A cryogenic process is disclosed for the selective removal of acidic gases from natural gases or from synthesis gases by adsorption in two towers and cooling of the gas outcoming from the first tower to the purpose of condensing a portion of $CO_2$ contained in the same gas, which is characterized in that in it a mixture is used constituted by one or more selective solvents selected among low molecular weight esters, alcohols and ethers.

42 Claims, 2 Drawing Figures

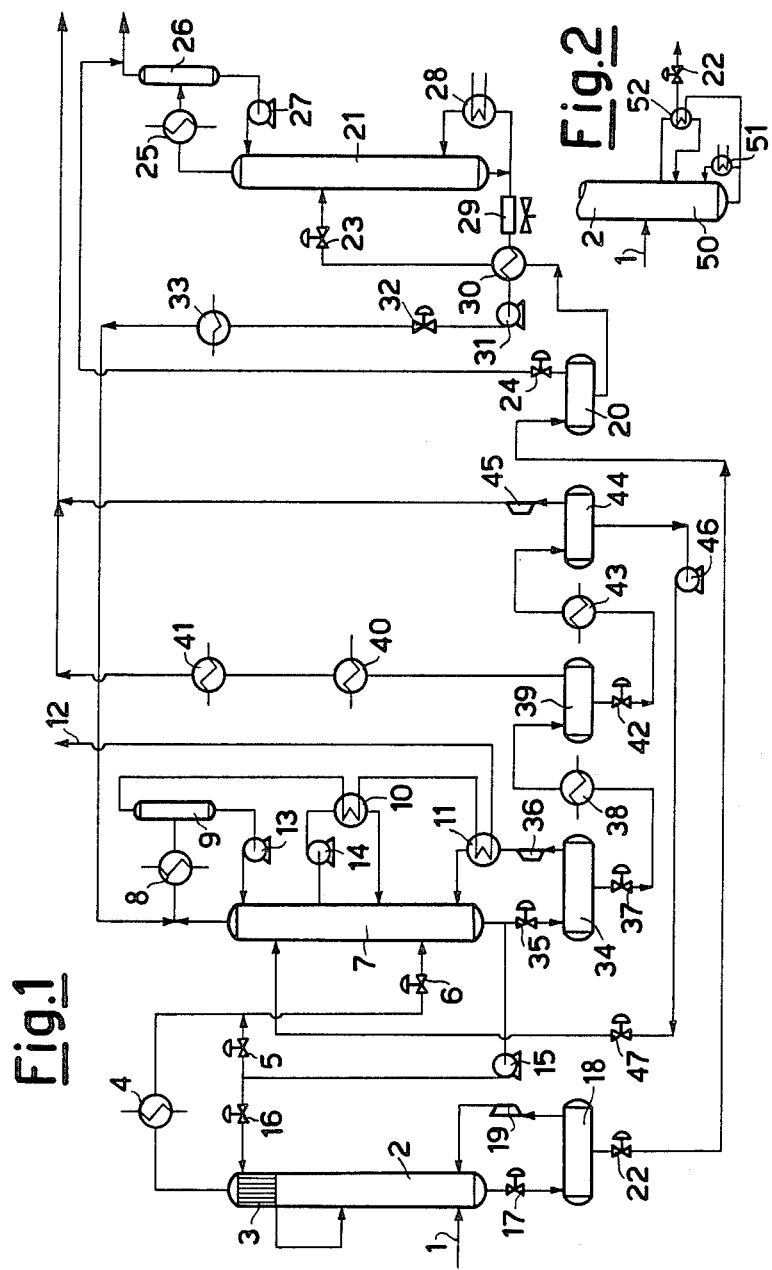

CRYOGENIC PROCESS FOR THE SELECTIVE REMOVAL OF ACIDIC GASES FROM MIXTURES OF GASES BY SOLVENTS

The present invention relates to a process for the selective removal of acidic gases, such as hydrogen sulphide and carbon dioxide from mixtures of gases, specifically natural or synthesis gases, which contain them, particularly suitable for the processing of gaseous mixtures with even very high concentrations of acidic gases.

To start up the production of gas fields with gases having a high content of acidic gases, or to the purpose of purifying the synthesis gases produced by starting from fuel oil or from coal, the need presently exists of having available treatment processes suitable to handle gases with high and very high contents of acidic components, able to yield products with even very strict specification.

The treatment of such gases requires the adoption of mixed cryogenic and solvent-using technologies, so as to combine the advantages of both technologies, a good purification of the gases with acceptable costs being obtained.

The same Applicant has already claimed a process of such a type by the U.S. Pat. No. 4,097,250 granted on June 27, 1979. In such patent, the purification is reported of a raw gas containing more than 70% of acidic gases, by the combined use of a low-temperature distillation, and of absorption by solvent.

The solvents described are dimethylether polyethyleneglycol and propylene carbonate.

It has been found now a new purification process particularly suitable to the treatment of gases containing high concentrations of acidic gases, based on the use of mixtures of selective solvents particularly suitable to be used in the purification processes by the cryogenic cycle.

Said process allows, among others, the two purge streams containing $CO_2$ and $H_2S$ respectively to be obtained substantially separated.

The process of the present invention for the selective removal of the acidic gases from natural gases or from synthesis gases by means of adsorption in two absorber towers and cooling of the gas outcoming from the first tower to condense a portion of $CO_2$ contained in the same gas, is characterized in that in it use is made of a mixture constituted by low molecular weight alcohols, esters and ethers belonging to the following classes:

Esters of alcohols of general formula $R_1COOR_2$, wherein $R_1$ and $R_2$ are alkyl groups of from 1 to 4 carbon atoms, equal to or different from each other, wherein one or more hydrogen atoms can be substituted by alcoholic groups, such as methyl formate, methyl acetate, ethyl acetate, monoethyleneglycol acetate.

esters of glycols of general formula:

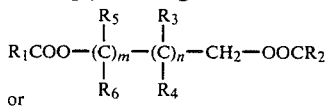

or

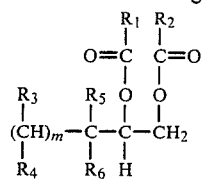

wherein $R_1$ and $R_2$ are alkyl groups having from 1 to 4 carbon atoms, equal to or different from each other, $R_3$, $R_4$, $R_5$, $R_6$, equal to or different from each other, are either alkyl groups containing from 1 to 3 carbon atoms or hydrogen atoms, m and n are integers which can have the value 0 or 1, such as 1,3-propanediol diacetate, 2,2-dimethyl-1,3,-propanediol diacetate, 1,2-propanediol diacetate, monoethyleneglycol diacetate.

Cyclic esters (lactones) of formula

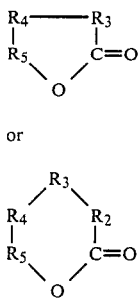

wherein $R_2$, $R_3$, $R_4$, $R_5$, equal to or different from each other, are alkylene groups wherein one or more hydrogen atoms can also be substituted by alkylic, alcoholic or ether groups, such as butyrolactone, caprolactone.

Alcohols of general formula

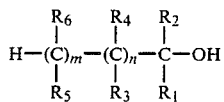

wherein $R_1$, $R_2$, $R_3$, $R_4$, $R_5$, $R_6$, equal to or different from each other, are alkyl groups having from 1 to 3 carbon atoms or hydroxy groups or hydrogen atoms, m and n are integers which can assume the values 0 and 1, such as monoethyleneglycol, diethyleneglycol, 1,2-propanediol, 1,3-propanediol, 1,4-butanediol, methanol, ethanol, propanol, isopropanol, n-butanol, isobutanol, sec-butanol, tert-butanol.

Cyclic ethers such as

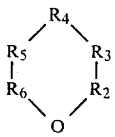

wherein $R_2$, $R_5$, $R_6$, equal to or different from each other, are alkylene groups wherein hydrogen can also be substituted by alkyl or methoxy groups, $R_3$ can be either an oxygen atom or an alkylene group wherein hydrogen can also be substituted by alkyl or methoxy groups, $R_4$ can be either equal to $R_3$ or can be absent in case of a pentaatomic ring, such as tetrahydrofuran, methyltetrahydrofuran, tetrahydropyran, 1,3-dioxolane, 2-methoxy-1,3-dioxolane, 1,4-dioxane.

Ethers of general formula $$R_1-O-CH_2-(R_3)_n-CH_2-O-R_2$$

wherein $R_1$ represents an alkyl group of from 1 to 4 carbon atoms, $R_2$ is either an alkyl group of from 1 to 4 carbon atoms or a hydrogen atom, $R_3$ is either an alkylene group or $(CH_2-O-CH_2)$, n is an integer which can have the value 0 or 1, such as 1,2-dimethoxyethane, 1,2-methoxyethoxyethane, dimethoxydiethyleneglycol, monomethoxydiethyleneglycol.

Ethers of general formula $$R_1-O-R_2$$

wherein $R_1$ and $R_2$, either equal to or different from each other, are alkyl groups of from 1 to 4 carbon atoms, wherein one or more hydrogen atoms can be substituted by alcoholic groups such as ethyl ether, propyl ether, 1-methoxyethanol, 1-methoxy-2-propanol, 1-methoxy-3-propanol, ethoxyethanol.

Ester-Ethers, compounds containing both the functions, of formula:

$$(R_4-O)_n-R_1-COOR_2(OR_3)_m$$

wherein $R_3$ and $R_4$, equal to or different from each other, are alkyl groups having from 1 to 4 carbon atoms, $R_2$ is an alkylene or alkyl group having from 1 to 4 carbon atoms, $R_1$ is either equal to $R_2$ or equal to $R_3$, m and n are integers which can have the value 0 or 1, such as methyl 2-methoxyethylacetate or methyl methoxyacetate or ethyl methoxyacetate.

and by one or more organic compounds selected from:
heptane,
natural gasoline fractions containing hydrocarbons having a number of carbon atoms comprised within the range of from 5 to 8;
monoaromatic compounds having a number of paraffinic carbon atoms comprised within the range of from 2 to 4, bound to the benzene ring either separately or as one or more linear or branched side chains;
dimethylethers of polyglycols having the glycolic unit $-CH_2-CH_2-O-$ repeated from once to five times;
methoxy- and/or ethoxyalcohols, wherein the alcoholic group is a radical having from 1 to 4 carbon atoms in either linear or branched chain.

The above reported solvents have a combination of several properties particularly favourable for their use as selective solvents.

They have indeed a high stability under the use conditions, high solvent power for the acidic gases, high selectivity for $H_2S$ and $CO_2$ relatively to hydrocarbons, low molecular weight and low melting point. This last characteristic is essential for the application in a cryogenic process.

In the case of the processing of natural gas, after the condensation at low temperature and before the end absorption by solvent, the gas is available at low temperatures, considerably lower than 0° C.

During the end absorption, it is useful to be able to reach temperatures considerably lower than the gas temperature, which are very favourable, because in this way the absorption power of the solvent and its selectivity increase. The solvents of the process according to the invention show low melting point and are hence particularly suitable for use in a cryogenic process.

The organic compound can be added in proportions comprised within the range of from 0.3 to 40% by weight relatively to the weight of the resulting mixture.

The above described mixture can be used in a threestep system, such steps comprising:
(a) the feeding of the gas to be purified to the first absorber tower, to the purpose of absorbing $H_2S$;
(b) the feeding of the gas outcoming from the first absorber tower, after being cooled and partly condensed, to the second absorber tower in order to reduce its $CO_2$ content to the desired value;
(c) the regeneration of the mixture used in the absorption of the acidic gases.

The cooling of the gas substantially purified from $H_2S$ can take place in a heat exchanger by vapourizing a portion of $CO_2$ contained in the $CO_2$-rich mixture in a suitable point of the regeneration.

It is preferable that the acidic gases not condensed after the cooling be at a concentration not higher than 30% by mol in the gas phase, and it is still more preferable that they be comprised within the range of from 15 to 30% by mol.

The cooling of the gas substantially purified from $H_2S$ can also take place inside the second absorber tower. By means of such a cooling, which causes part of $CO_2$ to condense, the distillation tower used in the prior processes is eliminated.

The mixture used for the absorption of $H_2S$ in the first absorber tower can be regenerated first by means of one or more expansion steps (at maximum, three of such steps) from which above all the useful components coabsorbed in step a) are recovered, then by means of one or more further expansion steps (at maximum, four of such steps), from which mainly $H_2S$ evolves, and subsequently by means of a distillation toward from the top of which mainly $H_2S$ outcomes; the mixture thus regenerated is recycled to the second absorber tower.

A portion of the mixture used for the absorption of $CO_2$ in the second absorber tower can be regenerated by means of one or more expansion steps (at maximum, three of such steps) from which above all the useful components co-absorbed in step b) are recovered, followed by one or more further expansion steps (at maximum, four of such steps), from which mainly $CO_2$ evolves; after such regeneration, said portion is recycled to the second absorber tower. The residual portion of the mixture used for the absorption of $CO_2$ is on the contrary fed to the first absorber tower.

The useful components which evolve from the expansions of the mixture rich in $H_2S$ are compressed, cooled and recycled to the first absorber tower, whilst those which evolve from the expansions of $CO_2$-rich mixture are compressed, cooled and recycled to the second absorber tower.

As an alternative, the useful components of the $H_2S$-rich mixture and of the $CO_2$-rich mixture can be recovered by expanding the two streams of rich mixture in an identical number of steps and under the same pressures, then recycling by one single compressor the components recovered to the absorber tower.

The expansions of the mixtures rich in $H_2S$ and $CO_2$ can be carried out in an expansion valve, or, at least partly, in a turbine.

The regeneration by expansion of the mixture rich in $CO_2$ can be integrated with the heating of the same mixture, in order to promote the removal of $CO_2$ by evaporation and recover cooling power to be used in the process.

The expansion steps from which mainly $CO_2$ evolves can be from 1 to 4, producing streams of $CO_2$ under progressively lower pressures, of which, one or two can be kept under vacuum, in which case the acidic gases evolved must be compressed again. In some cases, on the contrary, operating under vacuum is not necessary, because the end pressure is a function of the temperature reached and of the purification level desired.

The streams mainly containing $CO_2$ produced under high pressures can be expanded by means of an expansion valve, or by a turbine, to the delivery pressure, to the purpose of producing work and refrigerating effect.

The first absorber tower operates under a pressure comprised within the range of from 20 to 110 kg/cm$^2$ and at a temperature comprised within the range of from $-30°$ C. to 40° C.; the second absorber tower operates under a pressure comprised within the range of from 20 to 110 kg/cm$^2$ and at a temperature comprised within the range of from $-100°$ C. to 10° C.; finally, the distillation tower for the regeneration of the solvent operates under a pressure comprised within the range of from 0.1 to 5 kg/cm$^2$, and at a head temperature comprised within the range of from $-60°$ C. to 10° C. and at a bottom temperature comprised within the range of from 10° C. to 200° C.

Atop the first absorber tower a rectification unit can be installed, in order to reduce the losses of absorbing mixture entrained by the head gas of the absorber tower, the head condenser of which is cooled by the $CO_2$-rich mixture outcoming from the second absorber tower before the same mixture be fed to the first absorber tower.

Another possible contrivance consists in adding the mixture to the natural or synthesis gas outcoming from the first absorber tower before said gas be cooled by heat exchangers or expansion in valve or turbine, to the purpose of preventing that $CO_2$ crystallization may occur.

The absorbing mixture of the second absorber tower can be drawn from an intermediate point of the same absorber tower, cooled by using at least a portion of the residual cooling power of the gas processed and/or by using at least a portion of the residual cooling power of $CO_2$, and fed to the tower immediately under the drawing point.

The exhausted mixture leaving the first or the second absorber tower can be mixed with the natural or synthesis gas and cooled to the purpose of carrying out a preliminary absorption and of discharging the absorber.

At last, a further contrivance consists in mixing at least once the regenerated mixture with the gas or gases outcoming from one or from both of the absorber towers, the mixtures thus formed being then cooled to the purpose of separating the regenerated mixture from the same gas.

The mixing or the mixings between the gas or the gases outcoming from one or from both of the absorber towers and the absorption mixture are preferably carried out in a mixer by feeding such streams in countercurrent to each other. Said mixings are preferably two when carrying out a plurality of mixings is desired. In case the gas, or each gas outcoming from one absorber tower undergoes two mixings, such mixings can be carried out in the following way: first, a mixing of the gas being treated with the regenerated mixture takes place, and then to said mixing a cooling and a separation follows of the mixture obtained, thus from the gas the regenerated mixture being separated, which mixture is in its turn mixed in a second mixing step with the gas leaving the absorber tower. To said second mixing step a cooling and a separation follows of the mixture obtained in said second mixing, from the gas, which is fed to the first mixing, the regenerated mixture, which is fed to the absorber tower, being separated.

The two coolings following the two mixings can be carried out at the same temperature or at different temperatures, preferably within a temperature range between $-50°$ and $-100°$ C.

The invention shall be now better described with reference to the flow sheet of attached FIGS. 1 and 2 which show preferred forms of embodiment, which however must not be considered as limitative of the same invention.

Referring to FIG. 1, the raw gas is supplied to the plane by the piping 1, and is washed in countercurrent flow in the first absorber 2.

The absorber is equipped with a rectification unit and with a reflux condenser 3 to the purpose of knocking down the vapourized mixture. The gas is then cooled, thus the most of $CO_2$ condensing in the heat exchanger 4, it is added to the mixture, metered by the valve 5 to the purpose of preventing $CO_2$ from crystallizing, and is expanded to the treatment pressure by the valve 6. The expanded gas is washed in countercurrent flow by the mixture in the absorber 7 to the purpose of removing $CO_2$.

The gas leaving the absorber 7 is mixed with completely purified mixture and is cooled in the heat exchanger 8, is separated from the mixture in 9 and is sent to the recovery of the refrigerating power in the heat exchangers 10 and 11, and is then supplied to the distribution system by means of the pipe 12. The cooling mixture, separated from the gas in 9, is pumped into the absorber 7 by the pump 13. Further mixture, not completely purified, is introduced into the absorber at an intermediate level. In order to reduce the average absorption temperature, the mixture is extracted from an intermediate tray of the absorber 7, is pumped in 14 and cooled in 10 by the treated gas.

A portion of the mixture rich in $CO_2$ leaving the absorber 7 is sent by means of the pump 15 and of the valve 16 to cool the dephlegmator 3 and then to the absorber 2, wherein $H_2S$ is absorbed.

The $H_2S$-rich mixture is expanded in the valve 17 and is sent to the separator 18; the vapours are recompressed by 19 back to the absorber 2; the liquid is expanded in the separator 20 and then in the regeneration tower 21 by means of valves 22 and 23; the gas rich in $H_2S$ evolved in 20 leaves the plant through the valve 24.

The mixture is regenerated from $H_2S$ and $CO_2$ in the regenerating tower 21, equipped with condenser 25, reflux accumulator 26, reflux pumps 27, reboiler 28; this latter is heated by any heat source. The acidic gases outcoming from 26 are combined with those outcoming from the valve 24. The regenerated mixture is cooled by outer refrigerating means (either air or water, and/or a suitable refrigerating cycle) in 29 and by the rich mixture in 30 and is then sent to the heat exchanger 8 by means of the pump 31 and of the metering valves 32, after having been cooled in the heat exchanger 33.

The portion of mixture rich in $CO_2$ not used for $H_2S$ absorption is regenerated by expansion. It is fed to the separator 34, through the valve 35, wherein a methane-rich gas develops, which is recycled back to the absorber 7 by the compressor 36, after cooling by the treated gas in 11.

The mixture outcoming from 34 is expanded by the valve 37, is heated in 38, and is fed to the separator 39, from which $CO_2$ evolves; said $CO_2$ is heated in 40 and 41 and is then discharged from the plant.

The mixture outcoming from 39 is expanded under vacuum by the valve 42, is heated in the exchanger 43 and is then sent to the separator 44. $CO_2$ is compressed to nearly atmospheric pressure in compressor 45; the mixture still containing meaningful amounts of $CO_2$ is sent through the pump 46 and the metering valve 47 to an intermediate level of the absorber 7.

The heat exchanger 38 can be the same exchanger 4 (which are on the contrary shown separated in the Figure); in such case, the mixture outcoming from 34 is heated, a fairly good amount of $CO_2$ contained in the raw gas from the first absorber tower being condensed.

The exchanger 43 can be the same exchanger 8 (also in this case, they are separately shown in the Figure).

By the above described flow diagram obtaining is possible a treated gas containing less than 1 ppm of $H_2S$ and less than 10 ppm of $CO_2$.

Another possible route to recover the co-absorbed useful products is shown in FIG. 2.

The rich mixture leaving the absorber 2 is directly fed to an exhausting unit 50 installed under the absorber 2. The heat is supplied to the exhausting unit by suitable heating fluids in the bottom reboiler 51 and in the intermediate reboiler 52. In this latter, the tower bottom product, which contains now only negligible amounts of useful products, is cooled. It is expanded in the valve 22 and sent to the separator 20.

The new equipment pieces 50, 51 and 52 replace the equipment pieces 17, 18 and 19 of FIG. 1.

The same equipment can be used to the purpose of recovering the useful compound co-absorbed in the absorber 7 of FIG. 1, by sending a portion of the rich mixture leaving the absorber 7 to an exhausting unit.

Here, the equipment pieces to be replaced for by the exhausting unit and ancillary equipment are 34, 35, 36 and 11.

We claim:

1. Cryogenic process for the selective removal of acidic gases from natural gases or from synthesis gases by adsorption in two towers and cooling of the gas outcoming from the first tower to the purpose of condensing a portion of the acidic gases contained in the same gas, characterized in that it uses a mixture constituted by one or more selective solvents selected among low molecular weight esters, alcohols and ethers of the following classes:

esters of alcohols of general formula $R_1COOR_2$, wherein $R_1$ and $R_2$ are alkyl groups of from 1 to 4 carbon atoms, equal to or different from each other, wherein one or more hydrogen atoms can be substituted by alcoholic groups;

esters of glycols of general formula

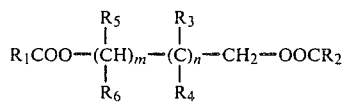

or

-continued

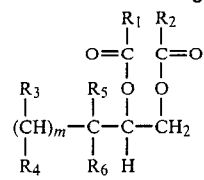

wherein $R_1$ and $R_2$ are alkyl groups having from 1 to 3 carbon atoms, equal to or different from each other, $R_3$, $R_4$, $R_5$, $R_6$, equal to or different from each other, are either alkyl groups containing from 1 to 3 carbon atoms or hydrogen atoms, m and n are integers which can have the value 0 to 1;

cyclic esters (lactones) of formula

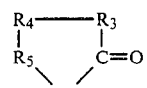

or

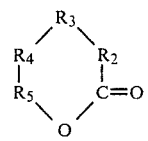

wherein $R_2$, $R_3$, $R_4$, $R_5$, equal to or different from each other, are alkylene groups wherein one or more hydrogen atoms can also be substituted by alkylic, alcoholic or ether groups;

alcohols of general formula

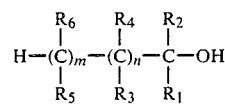

wherein $R_1$, $R_2$, $R_3$, $R_4$, $R_5$, $R_6$, equal to or different from each other, are alkyl groups having from 1 to 3 carbon atoms or hydroxy groups or hydrogen atoms, m and n are integers which can assume the values 0 or 1;

cyclic ethers such as

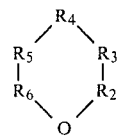

wherein $R_2$, $R_5$, $R_6$, equal to or different from each other, are alkylene groups wherein hydrogen can also be substituted by alkyl or methoxy groups, $R_3$ is either an oxygen atom or an alkylene group wherein hydrogen can also be substituted by alkyl or methoxy groups, $R_4$ is either equal to $R_3$ or can be absent in case of a pentaatomic ring;

ethers of general formula

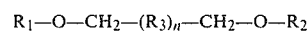

wherein $R_1$ is an alkyl group of from 1 to 4 carbon atoms, $R_2$ is either an alkyl group of from 1 to 4 carbon atoms or a hydrogen atoms, $R_3$ is either an alkylene group or ($CH_2$—O—$CH_2$), n is an integer which can have the value 0 or 1;

ethers of general formula $$R_1—O—R_2$$

wherein $R_1$ and $R_2$, either equal to or different from each other, are alkyl groups of from 1 to 4 carbon atoms, wherein one or more hydrogen atoms can be substituted by alcoholic groups;

ester-ethers, compounds containing both the functions, of formula:

$$R_4{-\!\!-}O)_n{-\!\!-}R_1{-\!\!-}COOR_2(OR_3)_m$$

wherein $R_3$ and $R_4$, equal to or different from each other, are alkyl groups having from 1 to 4 carbon atoms, $R_2$ is an alkylene group having from 1 to 4 carbon atoms, $R_1$ is either equal to $R_2$ or equal to $R_3$, m and n are integers which can have the value 0 or 1, and by one or more organic compounds selected from: heptane, fractions of natural gasolines containing hydrocarbons having a number of carbon atoms comprised within the range of from 5 to 8;

monoaromatic compounds having a number of paraffinic carbon atoms comprised within the range of from 2 to 4, bound to the benzene ring either separately or as one or more linear or branched side chains;

dimethylethers of polyglycols having the glycolic unit —$CH_2$—$CH_2$—O— repeated from once to five times;

methoxy- and/or ethoxyalcohols, wherein the alcoholic group is a radical having from 1 to 4 carbon atoms in either linear or branched chain.

2. Cryogenic process according to claim 1, wherein the mixture constituted by one or more selective solvents and by one or more organic compounds is used in a three-steps system, said steps comprising:

(a) the feeding of the gas to be purified to the first absorber tower to the purpose of absorbing $H_2S$;

(b) the feeding of the gas outcoming from the first absorber tower, after being cooled and partly condensed, to the second absorber tower to the purpose of reducing its content in $CO_2$ to the desired value;

(c) the regeneration of the mixture used in the absorption of the acidic gases.

3. Process according to claim 2, wherein the mixture used for the absorption of $H_2S$ in the first absorber tower is regenerated first by means of one or more expansion steps in which above all the useful components co-absorbed in step (a) are recovered, then by means of one or more further expansion steps, from which above all $H_2S$ evolves, subsequently by means of a distillation tower from the head of which mainly $H_2S$ evolves, the regenerated mixture being subsequently recycled to the second absorber tower.

4. Process according to claim 2, wherein a portion of the mixture used for the absorption of $CO_2$ in the second absorber tower is regenerated, first by means of one or more expansion steps in which above all the useful components co-absorbed in step (b) are recovered, then by means of one or more further expansion steps, from which above all $CO_2$ evolves, the regenerated mixture being subsequently recycled to the second absorber tower, whilst the residual portion of the mixture used for the absorption of $CO_2$ is sent to the first absorber tower.

5. Process according to claim 3, wherein the expansion steps from which above all the useful components are recovered can be from 1 to 3.

6. Process according to claim 4, wherein the expansion steps from which above the useful components are recovered can be from 1 to 3.

7. Process according to claim 4, wherein the expansion steps from which mainly $CO_2$ evolves can be from 1 to 4, producing streams under progressively decreasing pressures.

8. Process according to claim 7, wherein 1 or 2 expansion steps are maintained under vacuum.

9. Process according to claims 4 or 7, wherein the stream or the streams mainly containing acidic gases, produced under high pressure, is/are expanded in turbine up to the delivery pressure, to the purpose of producing work and refrigerating effect.

10. Process according to claim 4, wherein the regeneration by expansion of the mixture rich in $CO_2$ is integrated by the heating of the same mixture to the purpose of favouring the removal of $CO_2$ by vapourization, and of recovering refrigerating power to be used in the process.

11. Process according to claims 3 or 4, wherein the expansions of the mixture rich in $H_2S$ and $CO_2$ take place in expansion valve or, at least partly, in turbine.

12. Process according to claim 2, wherein the first absorber tower as of item (a) operates under a pressure comprised within the range of from 20 to 110 kg/cm$^2$ and at a temperature comprised within the range of from $-30°$ to 40° C.

13. Process according to claim 2, wherein the second absorber tower as of item (b) operates under a pressure comprised within the range of from 20 to 110 kg/cm$^2$ and at a temperature comprised within the range of from $-100°$ to 10° C.

14. Process according to claim 2, wherein the distillation tower for the regeneration of the mixture operates under a pressure comprised within the range of from 0.1 to 5 kg/cm$^2$, at a head temperature of from $-60°$ C. to 10° C. and at a bottom temperature of from 10° C. to 200° C.

15. Process according to claims 3 or 5, wherein the useful components which evolve from the expansion or from the expansions of the mixture rich in $H_2S$ are compressed, cooled and recycled to the first absorber tower.

16. Process according to claims 4 or 6, wherein the useful components which evolve from the expansion or from the expansions of the mixture rich in $CO_2$ are compressed, cooled and recycled to the second absorber tower.

17. Process according to claims 3, 4, 5 or 6, wherein the recovery of the useful components of the natural gas or of the synthesis gas from the $H_2S$-rich mixture and from the $CO_2$-rich mixture is carried out by expanding the two streams of rich mixture through an identical number of steps and under the same pressures and recycling by one single compressor the recovered useful components back to the first absorber tower.

18. Process according to claim 2, wherein atop the first absorber tower a rectification unit is installed to the purpose of reducing the losses of absorbing mixture entrained in the head gas from the same absorber tower.

19. Process according to claim 18, wherein the head condenser of the rectification unit is cooled by the mixture rich in $CO_2$ outcoming from the second absorber tower before feeding the same mixture to the first absorber column.

20. Process according to claim 2, wherein to the natural gas or to the synthesis gas outcoming from the first absorber tower, before it is cooled, solvent is added to the purpose of preventing $CO_2$ from crystallizing.

21. Process according to claim 2, wherein the mixture of the second absorber tower as of item (b), is drawn from an intermediate point of the same absorber tower, is cooled and reintroduced back into the tower immediately under the drawing point.

22. Process according to claims 2 or 21, wherein at least a portion of the intermediate cooling of the mixture is carried out by using at least a portion of the residual refrigerating power of the processed gas.

23. Process according to claims 2 or 21, wherein at least a part of the intermediate cooling of the mixture is carried out by using at least a part of residual refrigerating power of $CO_2$.

24. Process according to claim 2, wherein the exhausted mixture outcoming from the first absorber tower or from the second absorber tower is mixed with the natural gas or with the synthesis gas and is subsequently cooled.

25. Process according to claim 2, wherein the regenerated mixture is mixed at least once with the gas or gases outcoming from one of or from both of the absorber towers, the mixtures thus formed being then cooled, the regenerated mixture being thus separated from the same gas.

26. Process according to claim 25, wherein the mixings between the gas or the gases outcoming from one of or from both of the absorber towers and the regenerated mixture are carried out by feeding said gas or gases and said mixture to a mixer in countercurrent to each other.

27. Process according to claim 25, wherein the mixings between each gas outcoming from one absorber tower and the regenerated mixture are in a number of at least two.

28. Process according to claim 27, wherein the first mixing is carried out by mixing the treated gas with the regenerated mixture, to said mixing a cooling and a separation of the mixture obtained follows, the regenerated mixture being thus separated from the gas, which regenerated mixture is mixed in its turn in a second mixing with the gas outcoming from the absorber tower, to which second mixing a cooling and a separation follows of the mixture obtained, from the gas, which is then sent to the first mixing, the regenerated mixture, which is then fed to the absorber tower, being separated.

29. Process according to claim 28, wherein the two coolings following the two mixings are carried out at the same temperature or at different temperatures comprised within a temperature range of from $-50°$ C. to $-100°$ C.

30. Process according to claim 2, wherein the cooling of the gas substantially purified from $H_2S$ takes place by means of heat exchanger, by vapourizing a portion of $CO_2$ contained in the $CO_2$-rich mixture in an intermediate point of the regeneration.

31. Process according to claim 2, wherein the cooling is carried out inside the second absorber tower.

32. Process according to claim 2, wherein the exhausted mixture outcoming from the first absorber tower is fed to an exhausting unit equipped with reboiler wherein the useful compounds are stripped and fed to the first absorber tower.

33. Process according to claim 2, wherein a portion of the exhausted mixture outcoming from the second absorber tower is fed to an exhausting unit equipped with reboiler wherein the useful compounds are stripped and fed to the second absorber tower.

34. Process according to claim 32 or 33 wherein the bottom product of the exhausting unit is undercooled in an intermediate reboiler of the same exhausing unit.

35. Process according to claim 1, wherein the organic compound is added in proportions comprised within the range of from 0.3 to 40% by weight of the resulting mixture.

36. Process according to claim 1, wherein the selective solvent is either methyl formate or methyl acetate or ethyl acetate.

37. Process according to claim 1, wherein the selective solvent is tetrahydropyran or 1,3-dioxolane or 1,4-dioxane or tetrahydrofuran or methyltetrahydrofuran or 2-methoxy-1,3-dioxolane.

38. Process according to claim 1, wherein the selective solvent is 1,3-propanediol diacetate or 2,2-dimethyl-1,3-propanediol diacetate or 1,2-propanediol diacetate or monoethyleneglycol diacetate.

39. Process according to claim 1, wherein the selective solvent is 1,2-dimethoxyethane or 1,2-methoxyethoxyethane or dimethoxydiethyleneglycol or monomethoxydiethyleneglycol.

40. Process according to claim 1, wherein the selective solvent is methyl 2-methoxyethylacetate or methyl methoxyacetate or ethyl methoxy acetate.

41. Process according to claim 1, wherein the selective solvent is methoxyethanol, 1-methoxy-2-propanol, 1-methoxy-3-propanol, monoethoxydiethyleneglycol or ethoxyethanol, ethyl ether, or propyl ether.

42. Process according to claim 1, wherein the selective solvent is monoethyleneglycol, diethyleneglycol, 1,2-propanediol, 1,3-propanediol, 1,4-butanediol, methanol, ethanol, propanol, isopropanol, n-butanol, isobutanol, sec-butanol or tert.butanol.

* * * * *